(12) United States Patent
Ohta et al.

(10) Patent No.: US 11,186,096 B2
(45) Date of Patent: Nov. 30, 2021

(54) CARD-ISSUING DEVICE

(71) Applicant: NIDEC SANKYO CORPORATION, Nagano (JP)

(72) Inventors: Keiji Ohta, Nagano (JP); Satoshi Yokoyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 422 days.

(21) Appl. No.: 16/335,005

(22) PCT Filed: Sep. 4, 2017

(86) PCT No.: PCT/JP2017/031720
§ 371 (c)(1),
(2) Date: Mar. 20, 2019

(87) PCT Pub. No.: WO2018/061632
PCT Pub. Date: Apr. 5, 2018

(65) Prior Publication Data
US 2021/0291554 A1    Sep. 23, 2021

(30) Foreign Application Priority Data

Sep. 30, 2016  (JP) .............................. JP2016-192739

(51) Int. Cl.
*B41J 3/50*         (2006.01)
*B41J 2/325*        (2006.01)
(Continued)

(52) U.S. Cl.
CPC ................. *B41J 2/325* (2013.01); *B41J 3/50* (2013.01); *B41J 13/12* (2013.01); *G06K 13/103* (2013.01)

(58) Field of Classification Search
CPC ..... B41J 2/325; B41J 13/12; B41J 3/60; B41J 2202/35; B41J 2/32; B41J 3/44; B41J 3/50; B41J 3/51
See application file for complete search history.

(56) References Cited

U.S. PATENT DOCUMENTS 5,326,179 A  *  7/1994  Fukai ...................... B41J 13/12
                                                                 400/521
5,768,143 A  *  6/1998  Fujimoto ............. G06Q 20/341
                                                                 235/375
(Continued)

FOREIGN PATENT DOCUMENTS

JP        07089270 A      4/1995
JP        11069269 A      3/1999
(Continued)

OTHER PUBLICATIONS

International Search Report corresponding to Application No. PCT/JP2017/031720; dated Oct. 31, 2017.

*Primary Examiner* — Huan H Tran
(74) *Attorney, Agent, or Firm* — Cantor Colburn LLP (57) ABSTRACT

A card-issuing device may include a card stack unit, a card feeding mechanism. A card reader unit configured to perform at least one of reading of data recorded on a card and recording of data onto a card, a printing unit, and a card-flipping unit. The printing unit may include a supply roll, a winding roll, and a thermal head. The thermal head may be arranged between the supply roll and the winding roll in a front-rear direction of the card-issuing device, the supply roll and the winding roll may be arranged above the thermal head, and the card stack unit, the card-flipping unit, the thermal head, and the card reader unit may be arranged in that order in the front-rear direction.

3 Claims, 4 Drawing Sheets

(51) Int. Cl.
*G06K 13/103* (2006.01)
*B41J 13/12* (2006.01)

(56) References Cited

U.S. PATENT DOCUMENTS

| | | | | |
|---|---|---|---|---|
| 5,959,278 | A * | 9/1999 | Kobayashi | B41J 2/325 |
| | | | | 235/449 |
| 6,873,348 | B1 * | 3/2005 | Isono | B41J 2/325 |
| | | | | 347/171 |
| 7,173,643 | B2 * | 2/2007 | Kubota | B41J 2/325 |
| | | | | 347/213 |
| 2003/0164982 | A1 | 9/2003 | Lien | |
| 2008/0156883 | A1 * | 7/2008 | Kubota | B41J 13/12 |
| | | | | 235/475 |
| 2008/0159797 | A1 * | 7/2008 | Higaki | B41J 13/12 |
| | | | | 400/76 |
| 2012/0176460 | A1 * | 7/2012 | Mochizuki | B41J 2/0057 |
| | | | | 347/213 |
| 2013/0249164 | A1 * | 9/2013 | Yokoyama | B41J 11/006 |
| | | | | 271/225 |
| 2018/0001673 | A1 * | 1/2018 | Takeshita | G06K 13/14 |
| 2018/0111396 | A1 * | 4/2018 | Aihara | B41J 13/0009 |
| 2019/0275809 | A1 * | 9/2019 | Ohta | B41J 2/33 |
| 2020/0016909 | A1 * | 1/2020 | Ohta | B41J 3/60 |

FOREIGN PATENT DOCUMENTS

| | | | |
|---|---|---|---|
| JP | 2000141845 | A | 5/2000 |
| JP | 2003104591 | A | 4/2003 |
| JP | 2007041635 | A | 2/2007 |
| JP | 2014104745 | A | 6/2014 |
| JP | 2015161991 | A | 9/2015 |

* cited by examiner

CARD-ISSUING DEVICE

CROSS REFERENCE TO RELATED APPLICATION

This is the U.S. national stage of application No. PCT/JP2017/031720, filed on Sep. 4, 2017. Priority under 35 U.S.C. § 119(a) and 35 U.S.C. § 365(b) is claimed from Japanese Application No. 2016-192739, Sep. 30, 2016; the disclosures of which are incorporated herein by reference.

TECHNICAL FIELD

At least an embodiment of the present invention relates to a card-issuing device of issuing a card.

BACKGROUND

A card-issuing device of issuing a card is conventionally known (see, for example, Patent Literature 1). The card-issuing device described in Patent Literature 1 includes a card reader configured to read data recorded on a card and record data onto a card, a card stacker including a card cassette in which cards not issued yet are stacked and housed and a card feeding mechanism configured to feed the cards housed in the card cassette toward the card reader, and a card collecting unit configured to collect unnecessary cards. The card stacker and the card collecting unit overlap in the vertical direction. The card reader is arranged in front of the card stacker.

Further, as a conventional card-issuing device of issuing a card, a card-issuing device including a card rotating mechanism configured to rotate a card in a predetermined direction is known (see, for example, Patent Literature 2).

In the card-issuing device described in Patent Literature 2, the card rotating mechanism includes a driving roller and a driven roller configured to convey a card, an attachment member to which the driving roller and the driven roller are rotatably attached, and a rotation driving unit configured to rotate the attachment member. This card rotating mechanism makes it possible to flip the front and back of a card.

Further, a printing device of performing a printing onto a card is conventionally known (see, for example, Patent Literature 3). The printing device described in Patent Literature 3 includes an ink ribbon cartridge having a supply roll and winding roll configured to wind ink ribbon, and a main body configured to detachably attach the ink ribbon cartridge. Further, the printing device also includes a card conveying mechanism configured to convey a card, a thermal head configured to heat the ink ribbon to transfer ink from the ink ribbon onto the card to perform a printing, and a ribbon feeding mechanism configured to feed the ink ribbon between the supply roll and the winding roll. The supply roll is arranged above and in front of the thermal head, and the winding roll is arranged above and behind the thermal head.

PATENT LITERATURE

[Patent Literature 1] Japanese Unexamined Patent Application Publication No. 2015-161991
[Patent Literature 2] Japanese Unexamined Patent Application Publication No. 2007-41635
[Patent Literature 3] Japanese Unexamined Patent Application Publication No. 2014-104745

The inventor(s) of the present application are considering adding a double-sided printing function capable of performing a printing on both sides of a card to the card-issuing device described in Patent Literature 1. The card-issuing device described in Patent Literature 1, the printing device described in Patent Literature 3, and the card rotating mechanism described in Patent Literature 2 can be combined to add a double-sided printing function to the card-issuing device described in Patent Literature 1. However, simply combining the card-issuing device described in Patent Literature 1, the printing device described in Patent Literature 3, and the card rotating mechanism described in Patent Literature 2 may cause the card-issuing device to be increased in size in the front-rear direction.

SUMMARY

Therefore, at least an embodiment of the present invention is to provide a card-issuing device having a double-sided printing function while being downsized in the front-rear direction.

In order to solve the above problem, a card-issuing device of at least an embodiment of the present invention is a card-issuing device of issuing a card, including: a card stack unit including a card housing part to stack and house the card not issued yet and a card feeding mechanism configured to feed out a lowest card in the card housing part; a card reader unit configured to perform at least one of reading of data recorded on the card and recording of data onto the card; a printing unit configured to perform a printing on the card; and a card-flipping unit configured to flip the front and the back of the card, wherein the printing unit includes a supply roll configured to wind an ink ribbon, a winding roll configured to wind up the ink ribbon supplied from the supply roll, and a thermal head configured to heat the ink ribbon to transfer ink from the ink ribbon on the card to perform a printing, the thermal head is arranged between the supply roll and the winding roll in a front-rear direction of the card-issuing device, the supply roll and the winding roll are arranged above the thermal head, and the card stack unit, the card-flipping unit, the thermal head, and the card reader unit are arranged in that order in the front-rear direction.

In the card-issuing device of at least an embodiment of the present invention, the card stack unit, the card flipping unit, the thermal head, and the card reader unit are arranged in that order in the front-rear direction. Thus, in at least an embodiment of the present invention, for example, when the card-issuing device is installed in an ATM (Automated Teller Machine) for use, the card-issuing device can be installed in the ATM so that the card reader unit is arranged on the front side of the ATM. Accordingly, when processing for a card to withdraw cash or the like in the ATM is completed by using only the card reader unit, it is not necessary to take in the card to the back side of the card-issuing device. Therefore, according to at least an embodiment of the present invention, it is possible to simplify processing for the card in that case and also to shorten a processing time of the card.

Further, since the card-issuing device of at least an embodiment of the present invention includes the printing unit configured to perform a printing on the card and the card flipping unit configured to flip the front and the back of the card, it is possible to perform a printing on both sides of the card. Further, in at least an embodiment of the present invention, since the card stack unit, the card flipping unit, the thermal head, and the card reader unit are arranged in that order in the front-rear direction, the card-issuing device can be downsized in the front-rear direction as compared with a case where the card stack unit, the thermal head, the card flipping unit, and the card reader unit are arranged in that order in the front-rear direction.

That is, according to at least an embodiment of the present invention, the card stack unit and the printing unit must be arranged so that the supply roll or the winding roll, which is arranged above the thermal head and is arranged on the card stack unit side in the front-rear direction, does not interfere with the card housing part in which cards are stacked and housed and which also has high height. However, in the case where the card stack unit, the thermal head, the card flipping unit, and the card reader unit are arranged in that order in the front-rear direction, the card stack unit and the printing unit must be arranged so that the supply roll or the winding roll does not interfere with the card housing part, and further the card flipping unit must be arranged between the thermal head and the card reader unit in the front-rear direction.

By contrast, in at least an embodiment of the present invention, since the card stack unit, the card flipping unit, the thermal head, and the card reader unit are arranged in that order in the front-rear direction, the card flipping unit can be arranged between the card stack unit and the thermal head in the front-rear direction and also below the supply roll or the winding roll.

Therefore, according to at least an embodiment of the present invention, the card-issuing device can be downsized in the front-rear direction as compared with the case where the card stack unit, the thermal head, the card flipping unit, and the card reader unit are arranged in that order in the front-rear direction. That is, according to at least an embodiment of the present invention, the card-issuing device has a double-sided printing function and can still be downsized in the front-rear direction.

In at least an embodiment of the present invention, the card-issuing device includes a first card collection storage and a second card collection storage configured to collect the card, the first card collection storage is arranged below the card stack unit, the second card collection storage is arranged below the card reader unit, and the card flipping unit includes a card holder configured to temporarily hold the card therein, a card pull-in and feed-out mechanism configured to pull the card into the card holder and feed out the card from the card holder, and a pivoting mechanism configured to pivot the card holder around a left-right direction serving as an axial direction of pivoting, the left-right direction being perpendicular to an up-down direction and the front-rear direction, a conveying path of the card is switched to, when the card holder pivots, a first conveying path through which the card is conveyed from the card holder toward the card reader unit, a second conveying path through which the card is conveyed from the card holder toward the first card collection storage, and a third conveying path through which the card is conveyed from the card holder toward the second card collection storage.

With this configuration, it is possible to collect the card in the first card collection storage and the second card collection storage by using the card flipping unit configured to flip the front and the back of the card. Further, with this configuration, it is possible to collect cards to be collected divisionally in the first card collection storage and in the second card collection storage, depending on the purpose. For example, a card in which an error has occurred when the card fed out from the card stack unit is newly issued can be collected in the first card collection storage, and a used card for disposal inserted from a card insertion port of the card reader unit can be collected in the second card collection storage. Further, with this configuration, even if two card collection storages: the first card collection storage and the second card collection storage are provided, it is possible to collect cards in the first card collection storage and the second card collection storage by using a common card flipping unit. Therefore, as compared to a case where a collection mechanism configured to collect cards in the first card collection storage and a collection mechanism configured to collect cards in the second card collection storage are separately provided, it is possible to simplify the configuration of the card-issuing device.

In at least an embodiment of the present invention, the card-issuing device includes a collection card conveying mechanism arranged either in the card conveying path between the card holder and the first card collection storage or in the card conveying path between the card holder and the second card collection storage, the collection card conveying mechanism being configured to convey the card, wherein a driving source of a card conveying mechanism configured to convey the card on the card conveying paths in the card reader unit and the printing unit and a driving source of the collection card conveying mechanism are separately provided.

With this configuration, in a state where the card is temporarily retained on the card conveying path between the card holder and the first card collection storage or the card conveying path between the card holder and the second card collection storage, it is possible to process other cards in the card reader unit or the printing unit. Therefore, in a situation where a card conveyed from the card holder toward the first card collection storage or the second card collection storage must be returned to the card holder for some reason after processing of the other cards in the card reader unit or the printing unit, it is possible to return the card to the card holder.

Effect of the Invention

As described above, the card-issuing device according to at least an embodiment of the present invention has a double-sided printing function while being downsized in the front-rear direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the drawings.
(Configuration of Card-Issuing Device)

Figure 1:
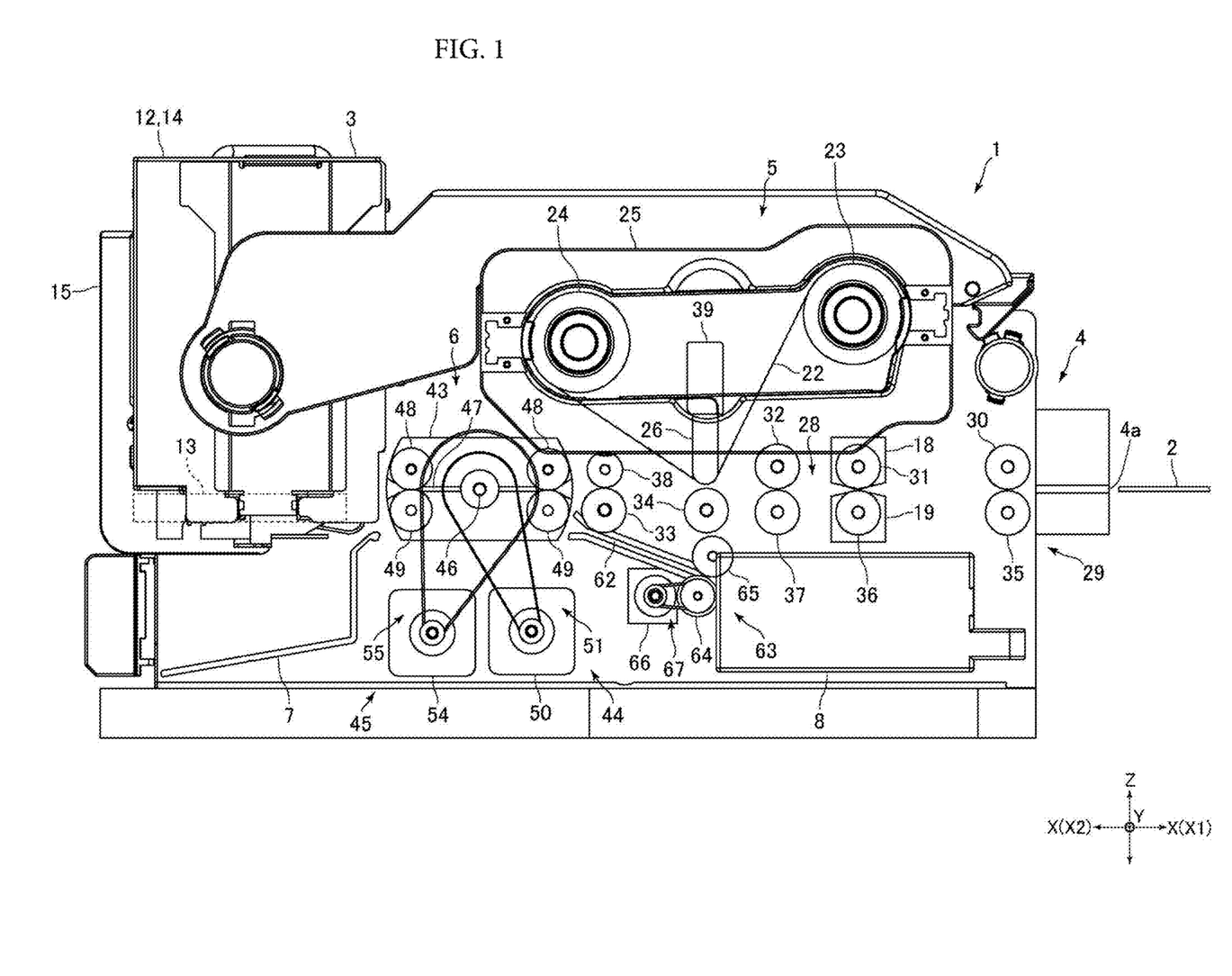
FIG. 1 is a diagram for explaining a schematic configuration of a card-issuing device according to an embodiment of the present invention, from a side view.

FIG. 1 is a diagram for explaining a schematic configuration of a card-issuing device 1 according to an embodiment of the present invention, from a side view. It is noted that an X direction in FIG. 1 is the front-rear direction of the card-issuing device 1, a Z direction in FIG. 1 is the up-down direction of the card-issuing device 1, and a Y direction in FIG. 1 is the left-right direction of the card-issuing device 1, which is perpendicular to the front-rear direction and the up-down direction. Further, an X1 direction side is the front side of the card-issuing device 1, and an X2 direction side opposite to the X1 direction side is the rear side of the card-issuing device 1, in the front-back direction.

The card-issuing device 1 of the present embodiment is a device of issuing a new card 2, and for example, is installed in an ATM for use. This card-issuing device 1 includes a card stack unit 3 configured to house the new card 2 not issued yet, a card reader unit 4 configured to perform at least one of reading data recorded on the card 2 and recording data onto the card 2, a printing unit 5 configured to perform a printing on the card 2, a card flipping unit 6 configured to flip the front and back of the card 2, and two card collection storages 7 and 8 configured to collect the card 2. The card-issuing device 1 is installed in an ATM so that the front end side of the card-issuing device 1 is arranged on the front side of the ATM.

The card 2 is, for example, a card made of vinyl chloride and having a thickness of about 0.7 to 0.8 mm, and has a substantially rectangular shape. On a surface of this card 2, a magnetic stripe on which magnetic data is recorded is formed, for example. Further, for example, the card 2 includes a built-in IC chip. It is noted that the card 2 may be a PET (polyethylene terephthalate) card having a thickness of about 0.18 to 0.36 mm, a paper card having a predetermined thickness, or the like.

The card stack unit 3 includes a card housing part 12 in which cards 2 not issued yet are stacked and housed, and a card feeding mechanism 13 configured to feed out the lowest card 2 in the card housing part 12. The card housing part 12 includes a card cassette 14 configured to house the cards 2, and a main body part 15 configured to detachably attach the card cassette 14. The card feeding mechanism 13 is arranged below the card housing part 12 and overlaps the card housing part 12 in the up-down direction. The card feeding mechanism 13 includes, for example, a feed pawl (not illustrated) that engages with the lowest card 2 in the card housing part 12 and feeds the card 2 to the outside of the card housing part 12, and a pawl feeding mechanism (not illustrated) for moving the feed pawl, so that the card 2 housed in the card housing part 12 is fed out to the front side.

The card reader unit 4 includes magnetic heads 18 and 19 configured to read magnetic data recorded on the card 2 and record magnetic data onto the card 2. Further, if the card 2 is a contact-type IC card, the card reader unit 4 is provided with an IC contact spring (not illustrated) that comes into contact with an external connection terminal of the IC chip of the card 2. Further, if the card 2 is a non-contact type IC card, the card reader unit 4 is provided with an antenna (not illustrated) for communicating with an antenna of the card 2 in a non-contact manner. At the front end of the card reader unit 4, an insertion and ejection port 4a of the card 2 is provided. It is noted that if no magnetic stripe is formed on the surface of the card 2, the card reader unit 4 does not have to include the magnetic heads 18 and 19.

The printing unit 5 includes an ink ribbon cartridge 25 having a supply roll 23 configured to wind an ink ribbon 22 is wound and a winding roll 24 configured to wind up the ink ribbon 22 supplied from the supply roll 23, a thermal head 26 configured to heat the ink ribbon 22 to transfer ink from the ink ribbon 22 onto the card 2 to perform a printing, a head elevating mechanism (not illustrated) configured to move the thermal head 26 upward and downward, and a ribbon feeding mechanism (not illustrated) configured to feed the ink ribbon 22 from the supply roll 23 to the winding roll 24.

Further, inside the card reader unit 4 and the printing unit 5, a conveying path 28 on which the card 2 is conveyed is formed. The card reader unit 4 and the printing unit 5 include a card conveying mechanism 29 configured to convey the card 2 on the conveying path 28. The card conveying mechanism 29 includes three driving rollers 30, 31, and 32 which constitute a part of the card reader unit 4, and a driving roller 33 and a platen roller 34 which constitute a part of the printing unit 5, so that the card 2 is conveyed in the front-rear direction. To the driving rollers 30 to 33 and the platen roller 34, a common driving source (specifically, a motor not illustrated) is coupled via a power transmission mechanism (not illustrated).

The driving rollers 30 to 32 are arranged to face the conveying path 28 from above. Further, the driving rollers 30 to 32 are arranged from the front side toward the rear side in that order and at a predetermined interval from each other. Pad rollers 35, 36, and 37 are arranged to be opposed to the driving rollers 30 to 32, respectively. The pad rollers 35 to 37 are arranged to face the conveying path 28 from below.

The driving roller 33 and the platen roller 34 are arranged to face the conveying path 28 from below. The platen roller 34 is arranged behind the driving roller 32. The driving roller 33 is arranged behind the platen roller 34. A cleaning roller 38 configured to remove dust and the like adhering to the surface of the card 2 before printing is arranged to be opposed to the driving roller 33. The cleaning roller 38 is arranged to face the conveying path 28 from above. The platen roller 34 is arranged directly below the thermal head 26.

The magnetic head 18 is arranged to face the conveying path 28 from above, and the magnetic head 19 is arranged to face the conveying path 28 from below. Further, the magnetic heads 18 and 19 are arranged at the same positions as those of the driving roller 31 and the pad roller 36 in the front-rear direction. The thermal head 26 is held by a head holding member 39. The thermal head 26 can come into contact with the card 2 from above via the ink ribbon 22. The thermal head 26 is arranged between the supply roll 23 and the winding roll 24 in the front-rear direction. In the present embodiment, the supply roll 23 is arranged in front of the thermal head 26, and the winding roll 24 is arranged behind the thermal head 26. Further, the supply roll 23 and the winding roll 24 are arranged above the thermal head 26.

The card flipping unit 6 includes a card holder 43 configured to temporarily hold the card 2 therein, a card pull-in and feed-out mechanism 44 configured to pull the card 2 into the card holder 43 and feed out the card 2 from the card holder 43, and a pivoting mechanism 45 configured to pivot the card holder 43 around the left-right direction serving as the axial direction of pivoting. The card holder 43 has a substantially rectangular parallelepiped block shape. The shape of the card holder 43 when viewed from the left-right direction is substantially rectangular. The width in the longitudinal direction of the card holder 43 when viewed from the left-right direction is wider than the width in the longitudinal direction of the card 2 having a substantially rectangular shape.

The card holder 43 is turnably supported by a supporting shaft 46. The supporting shaft 46 is arranged so that the axial direction of the supporting shaft 46 and the left-right direction coincide with each other. Further, the supporting shaft 46 supports a central portion of the card holder 43 having a substantially rectangular shape when viewed from the left-right direction. Inside the card holder 43, a conveying path 47 on which the card 2 is conveyed is formed.

When viewed from the left-right direction, the conveying path 47 is formed at the center position in the shorter direction of the card holder 43 having a substantially rectangular shape and is formed linearly along the longitudinal direction of the card holder 43. The conveying path 47 is arranged at the same position as that of the conveying path 28 in the left-right direction. Further, the conveying path 47 is arranged at the same position as that of a card feed-out port of the card stack unit 3 in the left-right direction. The card 2 temporarily held inside the card holder 43 is arranged in the conveying path 47 in a state where the card 2 is nipped between two driving rollers 48 and two pad rollers 49 described below.

The card pull-in and feed-out mechanism 44 includes the two driving rollers 48 arranged on both end sides of the conveying path 47, respectively, the two pad rollers 49 arranged to face the two driving rollers 48 respectively, a motor 50 configured to rotate the driving rollers 48, and a power transmission mechanism 51 configured to transmit the power of the motor 50 to the driving rollers 48, so that the card 2 is conveyed in the longitudinal direction of the card holder 43 when viewed from the left-right direction. The driving roller 48 is arranged to face the conveying path 47 from one side in the thickness direction of the card 2 passing through the conveying path 47, and the pad roller 49 is arranged to face the conveying path 47 from the other side in the thickness direction of the card 2 passing through the conveying path 47. The power transmission mechanism 51 includes a pulley, a belt, a gear train, and the like.

The pivoting mechanism 45 includes a motor 54 configured to pivot the card holder 43 around the supporting shaft 46, and a power transmission mechanism 55 configured to transmit the power of the motor 54 to the card holder 43. The power transmission mechanism 55 includes a pulley, a belt, and the like. The motors 50 and 54 are arranged below the card holder 43.

As illustrated in FIG. 1, the card stack unit 3, the card flipping unit 6, the thermal head 26, and the card reader unit 4 are arranged in that order in the front-rear direction. More specifically, the card stack unit 3, the card flipping unit 6, the thermal head 26, and the card reader unit 4 are arranged in that order from the rear side to the front side. As described above, the card-issuing device 1 is installed in an ATM so that the front end side of the card-issuing device 1 is arranged on the front side of the ATM, and the card reader unit 4 is arranged on the front side of the ATM.

Further, the card flipping unit 6 is arranged behind the driving roller 33 and the cleaning roller 38. Further, the rear end side portion of the card reader unit 4 is arranged below the supply roll 23. Further, in a state where the conveying path 47 is parallel to the front-rear direction when viewed from the left-right direction (the state illustrated in FIG. 1), the front end portion of the card flipping unit 6 is arranged below the winding roll 24.

The card collection storage 7 is arranged below the card stack unit 3, and is also arranged obliquely downward and rearward of the card holder 43. The card collection storage 8 is arranged below the card reader unit 4 and is also arranged obliquely downward and forward of the card holder 43. Further, the card collection storages 7 and 8 are arranged at the same position as that of the card holder 43 in the left-right direction. The card collection storage 7 of the present embodiment is a first card collection storage arranged below the card stack unit 3, and the card collection storage 8 is a second card collection storage arranged below the card reader unit 4.

Between the card holder 43 and the card collection storage 8, a conveying path 62 for the card 2 is formed. The conveying path 62 is arranged at the same position as that of the card holder 43 in the left-right direction. This conveying path 62 is inclined downward to the front side. In the conveying path 62, a collection card conveying mechanism 63 configured to convey the card 2 is arranged.

The collection card conveying mechanism 63 includes a driving roller 64 and a pad roller 65 arranged to be opposed to the driving roller 64. The driving roller 64 is arranged to face the conveying path 62 from below, and the pad roller 65 is arranged to face the conveying path 62 from above. Further, the collection card conveying mechanism 63 includes a motor 66 configured to rotate the driving roller 64 and a power transmission mechanism 67 configured to transmit the power of the motor 66 to the driving roller 64. That is, in the present embodiment, a motor (not illustrated) serving as a driving source of the card conveying mechanism 29 configured to convey the card 2 on the conveying path 28 and the motor 66 as a driving source of the collection card conveying mechanism 63 are separately provided. The power transmission mechanism 67 includes a pulley, a belt, and the like.

Figure 2:
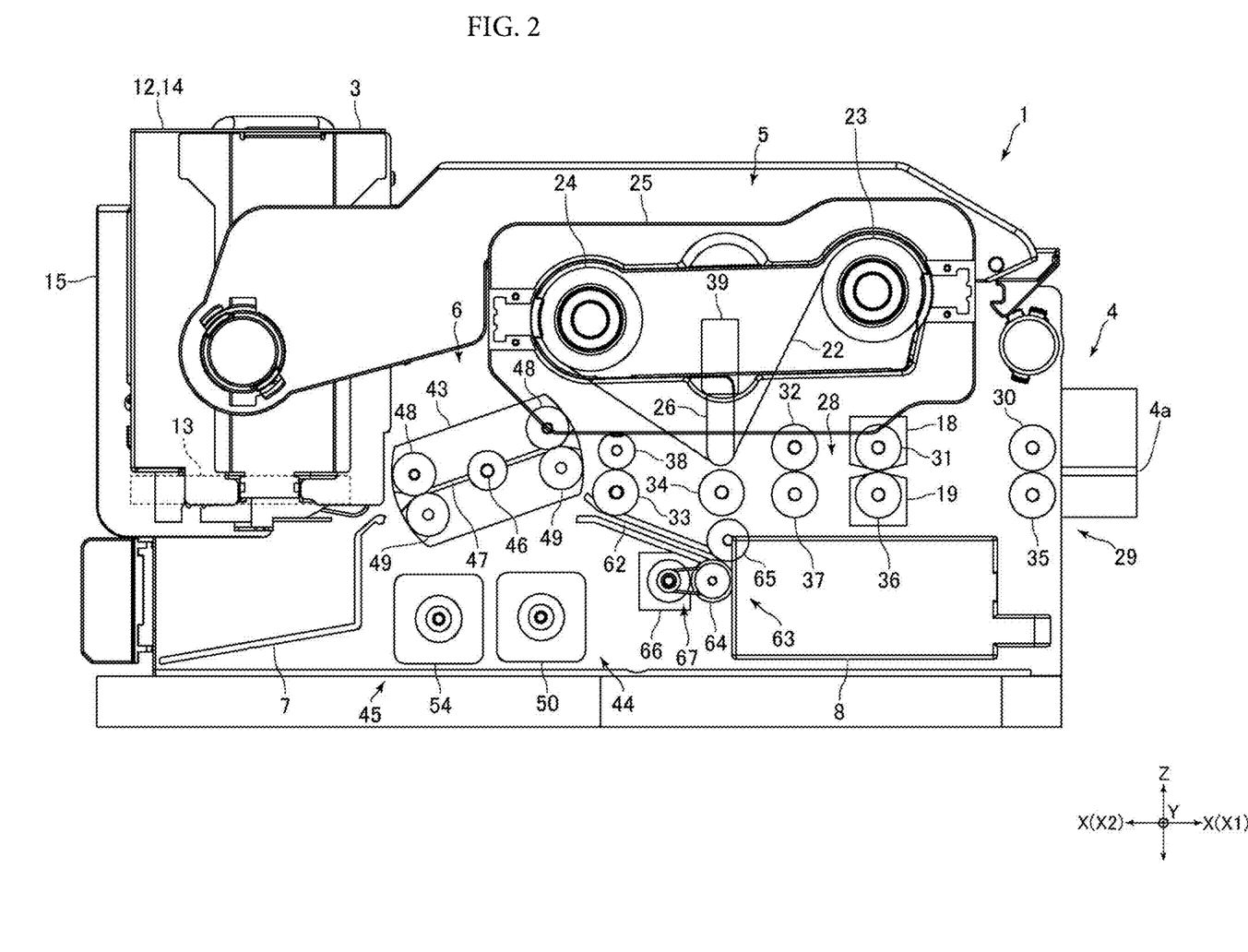
FIG. 2 is a diagram for explaining a state where a card is collected in a first card collection storage in the card-issuing device illustrated in FIG. 1.
Figure 3:
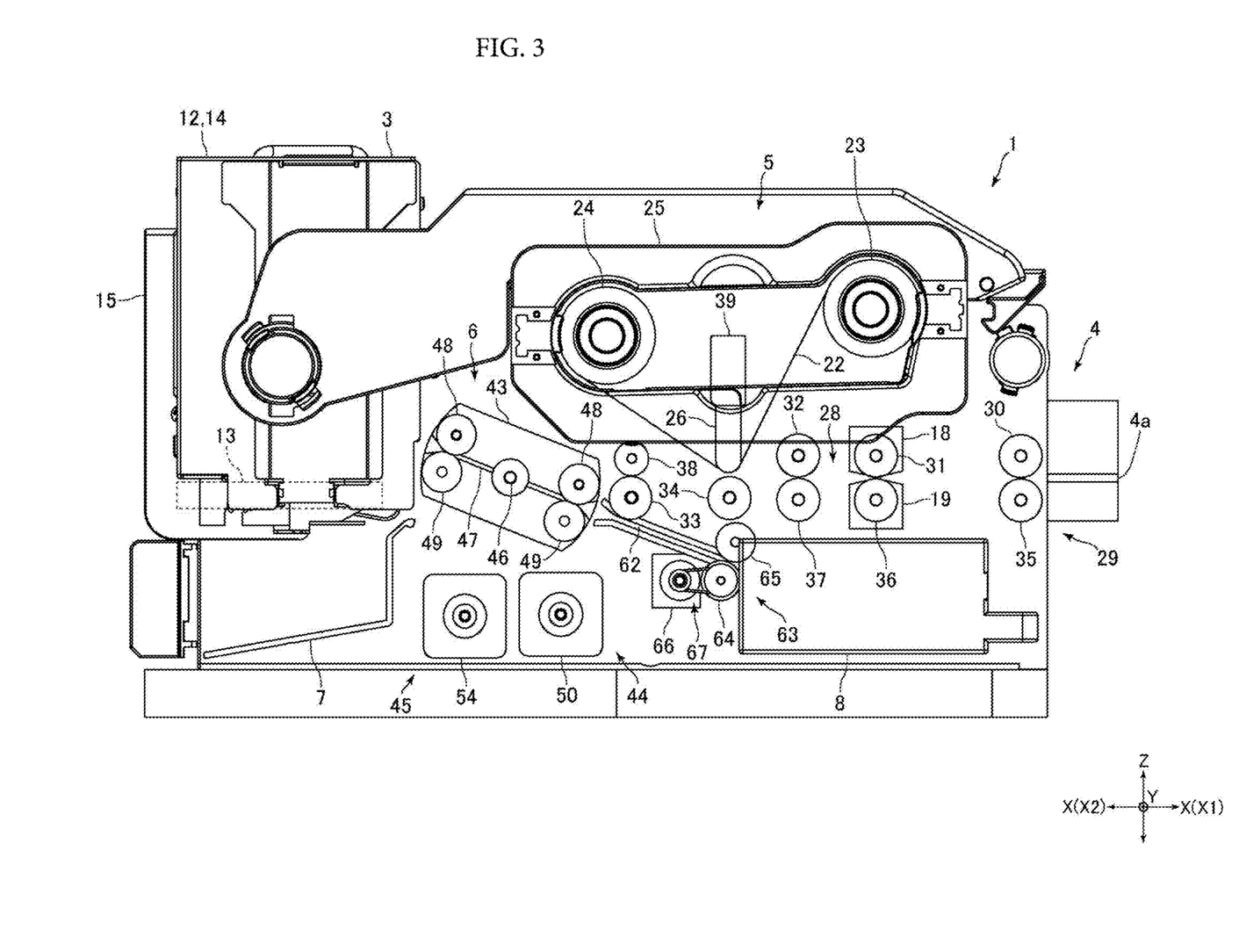
FIG. 3 is a diagram for explaining a state where a card is collected in a second card collection storage in the card-issuing device illustrated in FIG. 1.

In the present embodiment, when the card holder 43 pivots around the supporting shaft 46, the conveying path of the card 2 is switched to a first conveying path through which the card 2 is conveyed from the card holder 43 toward the card reader unit 4, a second conveying path through which the card 2 is conveyed from the card holder 43 toward the collection storage 7 (see FIG. 2), and a third conveying path through which the card 2 is conveyed from the card holder 43 toward the card collection storage 8 (see FIG. 3).

(Operation of Card-Issuing Device)

FIG. 2 is a diagram for explaining a state where the card 2 is collected in the card collection storage 7 in the card-issuing device 1 illustrated in FIG. 1. FIG. 3 is a diagram for explaining a state where the card 2 is collected in the card collection storage 8 in the card-issuing device 1 illustrated in FIG. 1.

As described above, the card-issuing device 1 is installed in an ATM. When withdrawal or transfer of cash is carried out in an ATM, the card reader unit 4 performs predetermined processing on the card 2 inserted from the insertion and ejection port 4a, and then ejects the card 2 from the insertion and ejection port 4a.

When the card 2 is newly issued in an ATM, as illustrated in FIG. 1, the card stack unit 3 feeds the card 2 in a state where the conveying path 47 is parallel to the front-rear direction, so that the card 2 is conveyed from the card stack unit 3 to the card holder 43 and the card 2 is conveyed from the card holder 43 to the card reader unit 4. In a state where the conveying path 47 is parallel to the front-rear direction, the conveying path 28 and the conveying path 47 are arranged at the same position in the up-down direction.

After the card 2 is fed from the card stack unit 3, the card pull-in and feed-out mechanism 44 and the card conveying mechanism 29 convey the card 2 forward to a position where the rear edge of the card 2 is located in front of the thermal head 26. When the card 2 is conveyed to the position where the rear edge of the card 2 is located in front of the thermal head 26, the front surface (upper surface) of the card 2 is cleaned by the effect of the cleaning roller 38.

After that, the thermal head 26 moves down and the card conveying mechanism 29 conveys the card 2 to the rear side, so that the thermal head 26 prints characters or the like on the front surface of the card 2. Further, after that, if a printing is performed on the back surface of the card 2, the card pull-in and feed-out mechanism 44 and the card conveying mechanism 29 convey the card 2 until the card 2 is held in the card holder 43, the card holder 43 is rotated by 180° to flip the card 2, and then the card pull-in and feed-out mechanism 44 and the card conveying mechanism 29 convey the card 2 forward to a position where the rear edge of the card 2 is located in front of the thermal head 26. When the card 2 is conveyed to the position where the rear edge of the card 2 is located in front of the thermal head 26, the back surface of the card 2 is cleaned by the effect of the cleaning roller 38. Further, after that, while the card conveying mechanism 29 conveys the card 2 backward, the thermal head 26 prints characters or the like on the back surface of the card 2.

After the printing on the card 2 is completed, the card reader unit 4 performs predetermined processing such as recording of magnetic data on the card 2, and then issues the card 2 from the insertion and ejection port 4a. Here, if a predetermined error occurs during the processing by the card reader unit 4, the card conveying mechanism 29 and the card pull-in and feed-out mechanism 44 convey the card 2 backward until the card 2 having the error is held in the card holder 43. After that, as illustrated in FIG. 2, the card holder 43 pivots so that the card 2 is conveyed from the card holder 43 to the card collection storage 7, and then the card pull-in and feed-out mechanism 44 convey the card 2 toward the card collection storage 7, so that the card 2 is collected in the card collection storage 7.

Further, when the card 2 is updated to a new card 2 in an ATM, the card conveying mechanism 29 and the card pull-in and feed-out mechanism 44 first convey the used card 2 until the used card 2 inserted from the insertion and ejection port 4a is held in the card holder 43. After that, as illustrated in FIG. 3, the card holder 43 pivots so that the card 2 is conveyed from the card holder 43 to the card collection storage 8, and then the card pull-in and feed-out mechanism 44 feeds out the card 2 to the conveying path 62. The collection card conveying mechanism 63 holds the card 2 fed out to the conveying path 62 in between the driving roller 64 and the pad roller 65.

Further, after the card 2 is fed out to the conveying path 62, the card holder 43 pivots so that the card 2 is conveyed from the card stack unit 3 to the card holder 43 and the card 2 is conveyed from the card holder 43 to the card reader unit 4. After that, as described above, the thermal head 26 prints characters or the like on the new card 2 fed out by the card stack unit 3, and then the card reader unit 4 performs predetermined processing to issue the card 2 from the insertion and ejection port 4a.

After the card 2 is issued from the insertion and ejection port 4a, the collection card conveying mechanism 63 conveys the card 2 held between the driving roller 64 and the pad roller 65 toward the card collection storage 8, so that the used card 2 is collected in the card collection storage 8. On the other hand, if the card 2 held between the driving roller 64 and the pad roller 65 must be returned to a user because some error occurs when a new card 2 is issued, the collection card conveying mechanism 63 and the card pull-in and feed-out mechanism 44 convey this card 2 until the card 2 Is held in the card holder 43. After that, the card holder 43 pivots so that the card 2 is conveyed from the card holder 43 to the card reader unit 4, and then the card pull-in and feed-out mechanism 44 and the card conveying mechanism 29 convey the card 2 to eject the card 2 from the insertion and ejection port 4a.

Main Effect of Present Embodiment

As described above, in the present embodiment, the card stack unit 3, the card flipping unit 6, the thermal head 26, and the card reader unit 4 are arranged in that order from the rear side to the front side, and the card stack unit 4 is arranged on the front side of an ATM. Accordingly, in the present embodiment, when processing for the card 2 to withdraw cash or the like in an ATM is completed by using only the card reader unit 4, it is not necessary to take in the card 2 to the back side of the card-issuing device 1. Therefore, in the present embodiment, it is possible to simplify processing for the card 2 in that case and also to shorten a processing time of the card 2.

In the present embodiment, the card-issuing device 1 includes the printing unit 5 configured to print on the card 2 and the card flipping unit 6 configured to flip the front and the back of the card 2. Accordingly, the card-issuing device 1 of the present embodiment makes it possible to perform a printing on both sides of the card 2. Further, according to the present embodiment, since the card stack unit 3, the card flipping unit 6, the thermal head 26, and the card reader unit 4 are arranged in that order from the rear side to the front side, the card-issuing device 1 can be downsized in the front-rear direction as compared with a case where the card stack unit 3, the thermal head 26, the card flipping unit 6, and the card reader unit 4 are arranged in that order from the rear side to the front side.

That is, in the present embodiment, the card stack unit 3 and the printing unit 5 must be arranged so that the winding roll 24 arranged above and also behind the thermal head 26, does not interfere with the card housing part 12 in which cards 2 are stacked and housed and has high height. However, if the card stack unit 3, the thermal head 26, the card flipping unit 6, and the card reader unit 4 are arranged in that order from the rear side to the front side, the card stack unit 3 and the printing unit 5 must be arranged so that the winding roll 24 does not interfere with the card housing part 12, and further the card flipping unit 6 must be arranged between the thermal head 26 and the card reader unit 4 in the front-rear direction. By contrast, according to the present embodiment, the card flipping unit 6 can be arranged between the card stack unit 3 and the thermal head 26 in the front-rear direction and also below the winding roll 24.

Therefore, according to the present embodiment, the card-issuing device 1 can be downsized in the front-rear direction as compared with the case where the card stack unit 3, the thermal head 26, the card flipping unit 6, and the card reader unit 4 are arranged in that order from the rear side to the front side.

That is, according to the present embodiment, the card-issuing device 1 has a double-sided printing function and can still be downsized in the front-rear direction.

In the present embodiment, when the card holder 43 pivots, the conveying path of the card 2 is switched to a first conveying path through which the card 2 is conveyed from the card holder 43 toward the card reader unit 4, a second conveying path through which the card 2 is conveyed from the card holder 43 toward the collection storage 7, and a third conveying path through which the card 2 is conveyed from the card holder 43 toward the card collection storage 8. Accordingly, in the present embodiment, it is possible to collect the card 2 in the card collection storages 7 and 8 by using the card flipping unit 6 configured to flip the front and the back of the card 2. Further, as described above, the card 2 in which an error has occurred when the card 2 is issued can be collected in the card collection storage 7, and the used card 2 can be collected in the card collection storage 8 when the card 2 is updated. In addition, since the card 2 can be collected in the two card collection storages 7 and 8 by using the common card flipping unit 6, it is possible to simplify the configuration of the card-issuing device 1 as compared to a case where a collection mechanism configured to collect cards 2 in the card collection storage 7 and a collection mechanism configured to collect cards 2 in the card collection storage 8 are separately provided.

In the present embodiment, the driving source (motor) of the card conveying mechanism 29 configured to convey the card 2 on the conveying path 28 and the driving source (motor 66) of the collection card conveying mechanism 63 configured to convey the card 2 on the conveying path 62 are separately provided. Accordingly, in the present embodiment, as described above, it is possible to perform processing of issuing a new card 2 in the state where the card 2 is temporarily retained on the conveying path 62, and it is possible to eject the card 2 remaining on the conveying path 62 from the insertion and ejection port 4a even if some error occurs when the new card 2 is issued.

OTHER EMBODIMENTS

The above-described embodiment is an example of an embodiment of the present invention, but the present invention is not limited thereto, and various modifications can be made without changing the gist of the present invention.

Figure 4:
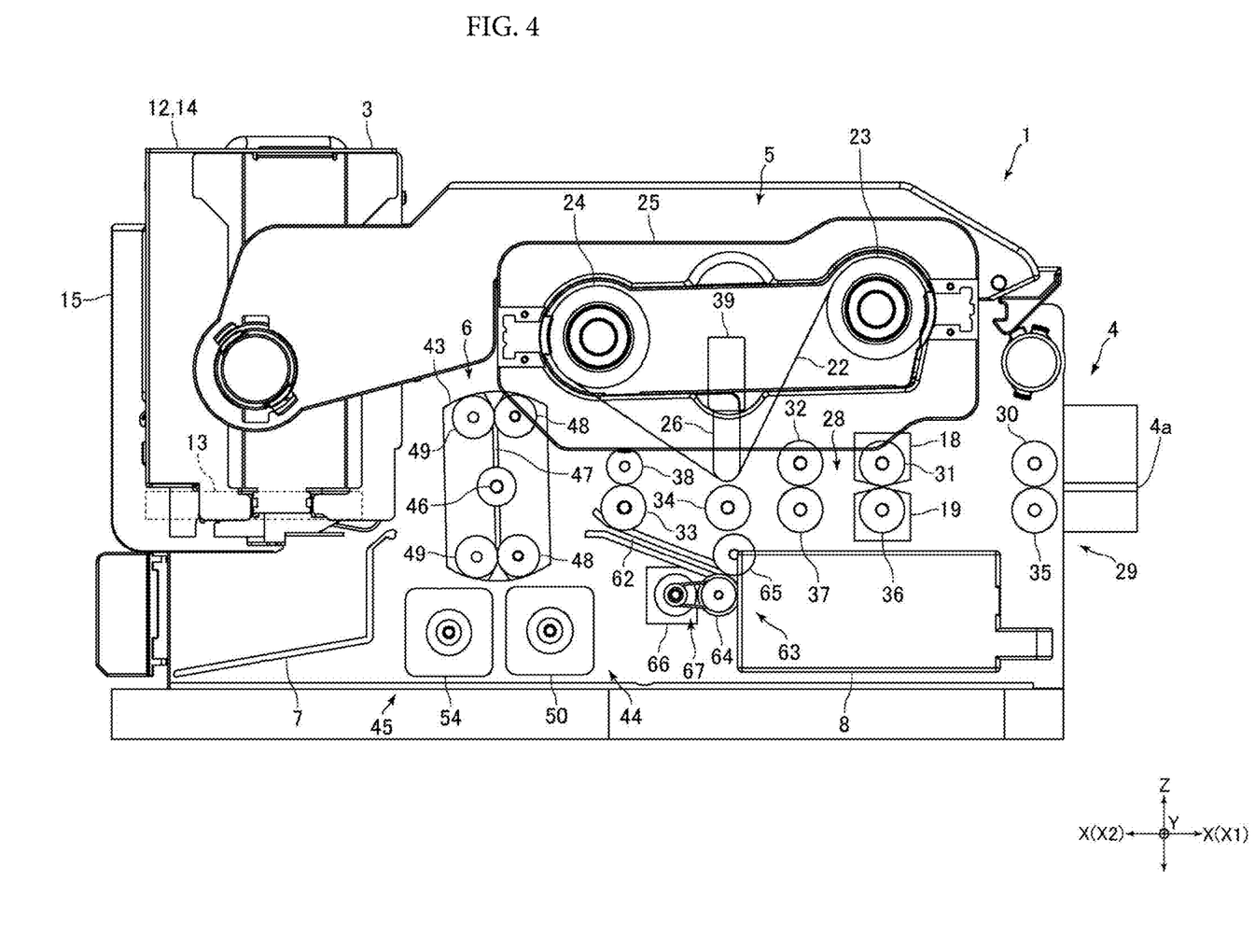
FIG. 4 is a diagram for explaining a state where a card is conveyed toward an optional unit in the card-issuing device illustrated in FIG. 1.

In the above-described embodiment, if a predetermined optional unit is provided below the card flipping unit 6, the card holder 43 may pivot so that the conveying path 47 becomes substantially parallel to the up-down direction when viewed from the left-right direction and the card 2 is conveyed from the card holder 43 to the optional unit, for example, as illustrated in FIG. 4. In this case, the optional unit is configured similarly to the card flipping unit 6, for example. It is noted that in FIG. 4, the same symbol is assigned to the configuration similar to that in the above-described embodiment.

In the above-described embodiment, the driving source (motor) of the card conveying mechanism 29 configured to convey the card 2 on the conveying path 28 and the driving source (motor 66) of the collection card conveying mechanism 63 configured to convey the card 2 on the conveying path 62 are separately provided. However, the driving source of the card conveying mechanism 29 and the driving source of the collection card conveying mechanism 63 may be in common with each other.

In the above-described embodiment, instead of the conveying path 62 formed between the card holder 43 and the card collection storage 8, a conveying path for the card 2 may be formed between the card holder 43 and the card collection storage 7. In this case, in that conveying path, a collection card conveying mechanism configured to convey the card 2 is arranged. Further, in this case, the used card 2 is collected in the card collection storage 7 when the card 2 is updated, and the card 2 in which an error has occurred when the card 2 is issued is collected in the card collection storage 8.

In the above-described embodiment, the card-issuing device 1 includes the two card collection storages 7 and 8. However, the card-issuing device 1 may include only either the card collection storage 7 or the card collection storage 8.

In the above-described embodiment, the card-issuing device 1 is installed in an ATM. However, the card-issuing device 1 may be installed in a host device other than an ATM, or may be used as a stand-alone device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card-issuing device for issuing a card, the card-issuing device comprising:
   a card stack unit comprising a card housing part configured to stack and house unissued cards; and
      a card feeding mechanism configured to feed out a lowest card in the card housing part;
   a card reader unit configured to perform at least one of reading of data recorded on a card and recording of data onto a card;
   a printing unit configured to perform a printing on the card; and
   a card-flipping unit configured to flip a front and a back of the card,
   wherein the printing unit comprises a supply roll configured to wind an ink ribbon, a winding roll configured to wind up the ink ribbon supplied from the supply roll, and a thermal head configured to heat the ink ribbon to transfer ink from the ink ribbon onto the card to perform a printing,
   the thermal head is arranged between the supply roll and the winding roll in a front-rear direction of the card-issuing device, the supply roll and the winding roll are arranged above the thermal head, and
   the card stack unit, the card-flipping unit, the thermal head, and the card reader unit are arranged in that order in the front-rear direction.

2. The card-issuing device according to claim 1, further comprising:
   a first card collection storage and a second card collection storage configured to collect the card,
   wherein the first card collection storage is arranged below the card stack unit,
   the second card collection storage is arranged below the card reader unit,
   the card flipping unit comprises a card holder configured to temporarily hold the card therein, a card pull-in and feed-out mechanism configured to pull the card into the card holder and feed out the card from the card holder, and a pivoting mechanism configured to pivot the card holder around a left-right direction serving as an axial direction of pivoting, the left-right direction being perpendicular to an up-down direction and the front-rear direction, and
   a conveying path of the card is structured so as to switch to, when the card holder pivots, a first conveying path through which the card is conveyed from the card holder toward the card reader unit, a second conveying path through which the card is conveyed from the card holder toward the first card collection storage, and a third conveying path through which the card is conveyed from the card holder toward the second card collection storage.

3. The card-issuing device according to claim 2, comprising:
a collection card conveying mechanism arranged either in the card conveying path between the card holder and the first card collection storage or in the card conveying path between the card holder and the second card collection storage, the collection card conveying mechanism being configured to convey the card,
wherein a driving source of a card conveying mechanism configured to convey the card on the card conveying paths in the card reader unit and the printing unit and a driving source of the collection card conveying mechanism are separately provided.

* * * * *